(12) United States Patent
Pyatkovskiy et al.

(10) Patent No.: US 8,649,275 B2
(45) Date of Patent: Feb. 11, 2014

(54) FAST SSL TESTING USING PRECALCULATED CRYPTOGRAPHYC DATA

(75) Inventors: Maksim Pyatkovskiy, Encino, CA (US); Soumyajit Saha, Woodland Hills, CA (US)

(73) Assignee: Ixia, Calabasas, CA (US)

( * ) Notice: Subject to any disclaimer, the term of this patent is extended or adjusted under 35 U.S.C. 154(b) by 353 days.

(21) Appl. No.: 13/009,427

(22) Filed: Jan. 19, 2011

(65) Prior Publication Data

US 2012/0182884 A1    Jul. 19, 2012

(51) Int. Cl.
H04L 12/26    (2006.01)

(52) U.S. Cl.
USPC ........... 370/250; 709/224; 713/168; 713/171; 703/13

(58) Field of Classification Search
None
See application file for complete search history.

(56) References Cited

U.S. PATENT DOCUMENTS

| | | | | |
|---|---|---|---|---|
| 6,094,485 A * | 7/2000 | Weinstein et al. | | 380/30 |
| 6,832,184 B1 * | 12/2004 | Bleier et al. | | 703/23 |
| 7,237,260 B2 * | 6/2007 | Yu et al. | | 726/11 |
| 7,240,203 B2 * | 7/2007 | Kessler et al. | | 713/171 |
| 7,382,882 B1 * | 6/2008 | Immonen | | 380/270 |
| 7,496,664 B2 * | 2/2009 | Hannel et al. | | 709/224 |
| 7,533,012 B2 * | 5/2009 | Walsh et al. | | 703/21 |
| 7,584,505 B2 * | 9/2009 | Mondri et al. | | 726/13 |

OTHER PUBLICATIONS

Freier et al., "The SSL Protocol Version 3.0", Nov. 18, 1996, Transport Layer Security Working Group, <draft-ietf-tls-ssl-version3-00.txt>, 65 Pages.*
Zhao et al., Anatomy and Performance of SSL Processing, IEEE International Symposium on Performance Analysis of Systems and Software, 2005, ISPASS 2005, Issued Mar. 20-22, 2005, pp. 1-10.
Juniper Networks, Inspection of SSL Traffic Overview, Published Jan. 12, 2010, accessed Jan. 19, 2011, http://www.juniper.net/techpubs/en_US/idp5.0/topics/concept/intrusion-detection-prevention-ssl-decryption-overview.html, pp. 1-4.

* cited by examiner

*Primary Examiner* — Hassan Kizou
*Assistant Examiner* — Amy Ling
(74) *Attorney, Agent, or Firm* — SoCal IP Law Group LLP; John E. Gunther; Steven C. Sereboff

(57) ABSTRACT

Methods and computer readable storage media to test secure network connections. One or more pre-calculated encryption data (PCCD) sets may be defined in accordance with a secure communications protocol. The one or more PCCD sets may be stored in a first PCCD memory and a second PCCD memory located respectively within a first port unit and a second port unit of a plurality of port units. Each PCCD set may include at least a first parameter and a second parameter generated by encrypting the first parameter. A simulated secure connection between the first port unit and the second port unit via a network under test may be opened using a selected PCCD set from the one or more PCCD sets without performing decryption processing.

22 Claims, 7 Drawing Sheets

FAST SSL TESTING USING PRECALCULATED CRYPTOGRAPHYC DATA

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to receiving and processing traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged.

Layer 7 protocols, or application layer protocols, include the Hyper Text Transfer Protocol (HTTP), the Simple Mail Transfer Protocol (SMTP), the File Transfer Protocol (FTP), the Post Office Protocol (POP3), and other protocols. These layer 7 protocols commonly communicate via a network using the TCP protocol. In some circumstances, information communicated by layer 7 protocols may be encrypted. Commonly, information may be encrypted using the Secure Sockets Layer (SSL) or Transport Layer Security (TLS) protocols that operate (essentially at layer 5) between the layer 7 protocol and the TCP protocol.

Traditionally, network devices, such as routers and switches, operated primarily at layer 2, which is to say network devices routed packets through a network based on information in the layer 2 header of each Ethernet packet. Such network devices generally ignore packet content. However, modern network devices may go beyond layer 2 headers to look in the content of IP packets. Network devices may perform shallow packet inspection, also called stateful packet inspection, by inspecting layer 4 headers. Some network devices perform deep packet inspection (DPI) by inspecting some or all of the payload content of each packet. Deep packet inspection may be performed to prevent propagation of viruses and other malicious code, to filter spam, to prevent unauthorized intrusion into private networks, to censor internet traffic in some countries, and other purposes.

In order to test a packet switched communications network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses.

In order to test a network or network device such as a server, a server load balancers, or any device that performs DPI, it may be necessary to establish real connections and send realistic data through the network under test. To test a network or network equipment that performs at least partial DPI of encrypted packets, it may be necessary to establish a large number of SSL/TLS connections through the network under test.

FIG. 1 shows a simplified flow chart of a process 100 for establishing and using a connection according to the SSL protocol using RSA for key exchange. The process 100 will be referred to in this patent as the SSL "handshake" process. The process 100 is usually performed by a client computing device and a server computing device that communicate via a network. The process 100 starts at 105 when the client device decides to open a SSL connection, and concludes at 190, usually by mutual agreement of the client and server devices. The process 100 may includes an exchange of messages between a client device and a server device, commonly called the SSL handshake.

At 110, the client device creates a first random number, called the "client random number" (CRN) in the SSL protocol. The client device then sends a message 115, called the "client hello" message in the SSL protocol, containing the CRN to the server device. The client hello message may include other information such as lists of compression protocols and encryption protocols supported by the client.

After receiving the client hello message 115, at 120 the server device generates a second random number, called the "server random number" (SRN) in the SSL protocol. The server device may then send a message 125, called the "server hello" message in the SSL protocol, containing the SRN to the client device. The server hello message may include other information such as a selection of a compression protocol and an encryption protocol (from the lists provided in the client hello message 115) to be used once the SLL connection is established.

The server device typically also sends a server certificate 127 to the client device. The server certificate 127 may include information required for the client to authenticate the server. The server certificate 127 may include a server pubic key that may be used by the client device to encrypt data to be sent to the server device.

After receiving and validating the server certificate, the client device generates a third random number, called the "pre-master secret" (PMS), at 130. At 140, the client device encrypts the PMS using the server public key from the server certificate 127. The encrypted PMS (EPMS) is then sent to the server device in a message 145, commonly termed the "client key exchange message". The EPMS is decrypted by the server device using a server private key at 150. The encryption of the PMS is considered asymmetrical because the public and private keys used to encrypt and decrypt the PMS are different.

At 160 and 165, the client device and the server device, respectively, calculate a master secret (MS) from the CRN, the SRN, and the PMS. The client device and the server device calculate the same MS, which is then used at 170 and 175 with a symmetrical encryption algorithm to encrypt and decrypt future communications via the SSL connection.

Throughout this description, elements appearing in block diagrams are assigned three-digit reference designators, where the most significant digit is the figure number where the element is introduced and the two least significant digits are specific to the element. An element that is not described in conjunction with a block diagram may be presumed to have the same characteristics and function as a previously-described element having the same reference designator.

DETAILED DESCRIPTION

Description of Apparatus

Figure 2:
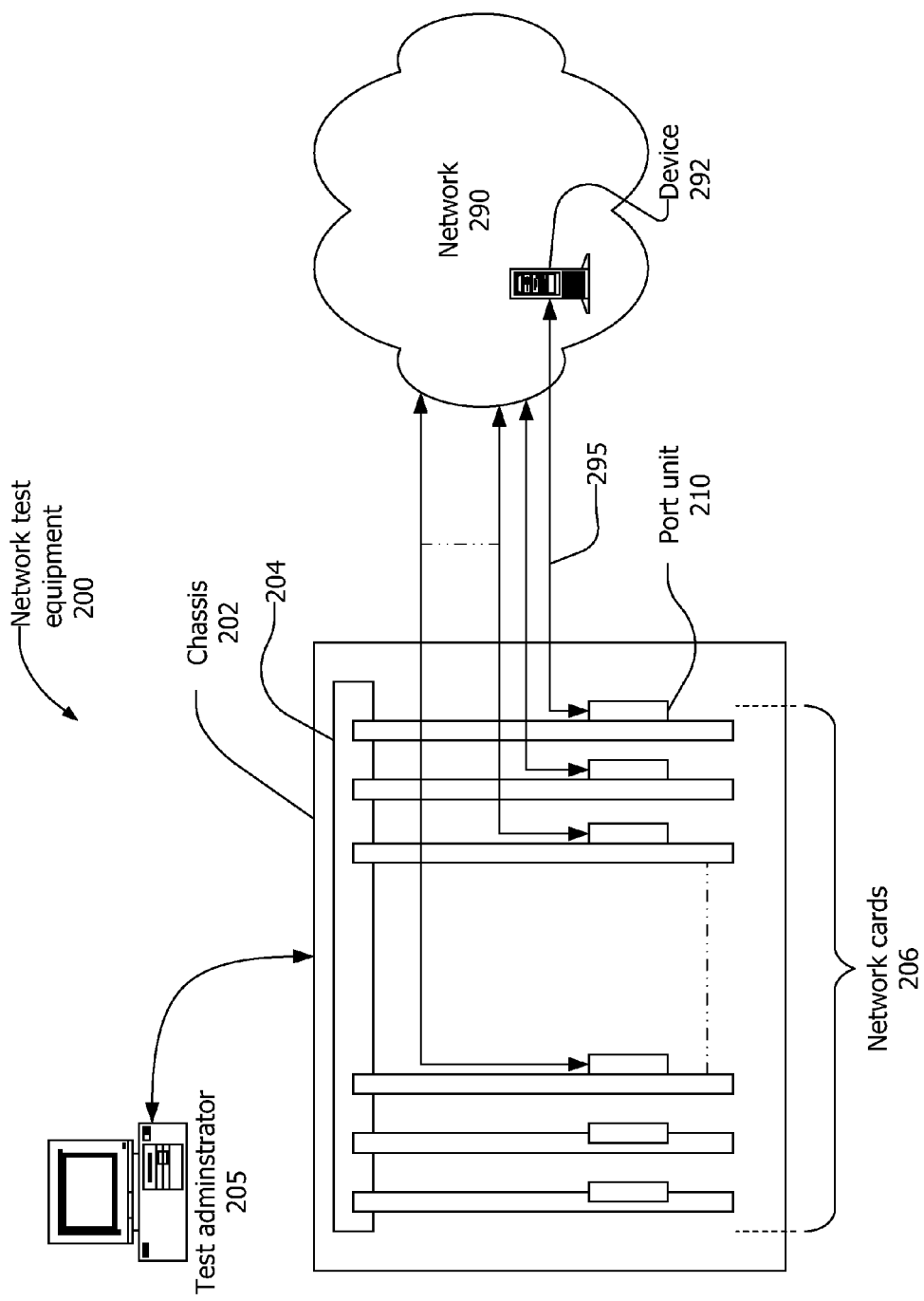
FIG. 2 is a block diagram of a network environment.

FIG. 2 shows a block diagram of a network environment. The environment may include network test equipment 200, a network 290 and plural network devices 292.

The network test equipment 200 may be a network testing device, performance analyzer, conformance validation system, network analyzer, or network management system. The network test equipment 200 may include one or more network cards 206 and a backplane 204 contained or enclosed within a chassis 202. The chassis 202 may be a fixed or portable chassis, cabinet, or enclosure suitable to contain the network test equipment. The network test equipment 200 may be an integrated unit, as shown in FIG. 2. Alternatively, the network test equipment 200 may comprise a number of separate units cooperative to provide traffic generation and/or analysis. The network test equipment 200 and the network cards 206 may support one or more well known standards or protocols such as the various Ethernet and Fibre Channel standards, and may support proprietary protocols as well.

The network cards 206 may include one or more field programmable gate arrays (FPGAs), application specific integrated circuits (ASICs), programmable logic devices (PLDs), programmable logic arrays (PLAs), processors and other kinds of devices. In addition, the network cards 206 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 206 may contain one or more port unit 210. Each port unit 210 may connect to the network 290 through one or more ports. Each port unit 210 may be connected to the network 290 through a communication medium 295, which may be a wire, an optical fiber, a wireless link, or other communication medium. Each network card 206 may support a single communications protocol, may support a number of related protocols, or may support a number of unrelated protocols. The network cards 206 may be permanently installed in the network test equipment 200 or may be removable.

The backplane 204 may serve as a bus or communications medium for the network cards 206. The backplane 204 may also provide power to the network cards 206.

The network devices 292 may be any devices capable of communicating over the network 290. The network devices 292 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as load balancers, routers, relays, hubs, switches, bridges, and multiplexers. In addition, the network devices 292 may include appliances, alarm systems, and any other device or system capable of communicating over a network.

The network 290 may be a Local Area Network (LAN), a Wide Area Network (WAN), a Storage Area Network (SAN), wired, wireless, or a combination of these, and may include or be the Internet. Communications on the network 290 may take various forms, including frames, cells, datagrams, packets or other units of information, all of which are referred to herein as packets. The network test equipment 200 and the network devices 292 may communicate simultaneously with one another, and there may be plural logical communications paths between the network test equipment 200 and a given network device 295. The network itself may be comprised of numerous nodes providing numerous physical and logical paths for data to travel.

Figure 3:
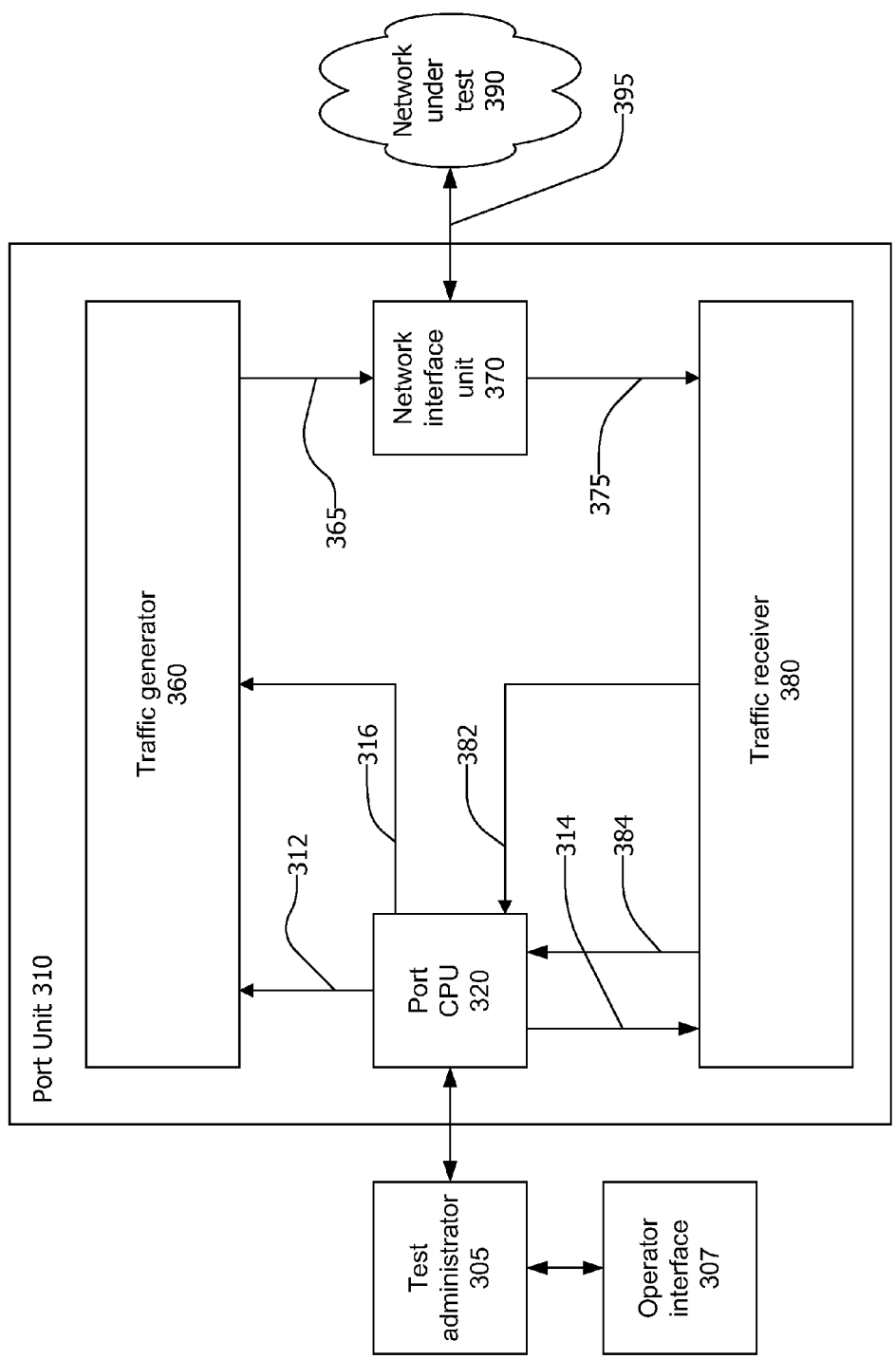
FIG. 3 is a block diagram of a port unit.

Referring now to FIG. 3, an exemplary port unit 310 may include a port central processing unit (CPU) 320, a traffic generator unit 360, a traffic receiver unit 380, and a network interface unit 370 which couples the port unit 310 to a network under test 390. The port unit 310 may be all or part of a network card such as the network cards 206.

The port CPU 320 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 320 may communicate with a test administrator 305. The test administrator 305 may be a computing device contained within, or external to, the network test equipment 200. The test administrator 305 may provide the port CPU 320 with instructions and data required for the port unit to participate in testing the network 390. The instructions and data received from the test administrator 305 may include, for example, definitions of packet streams to be generated by the port unit 310 and definitions of performance statistics that may be accumulated and reported by the port unit 310.

The port CPU 320 may provide the traffic generator unit 360 with stream forming data 312 to form a plurality of streams. The stream forming data 312 may include, for example, the type of packet, the frequency of transmission, definitions of fixed and variable-content fields within the packet and other information for each packet stream. The traffic generator unit 360 may then generate the plurality of streams in accordance with the stream forming data 312. The plurality of streams may be interleaved to form outgoing test traffic 365. Each of the streams may include a sequence of packets. The packets within each stream may be of the same general type but may vary in length and content.

The network interface unit 370 may convert the outgoing test traffic 365 from the traffic generator unit 360 into the electrical, optical, or wireless signal format required to transmit the test traffic to the network under test 390 via a link 395, which may be a wire, an optical fiber, a wireless link, or other communication link. Similarly, the network interface unit 370 may receive electrical, optical, or wireless signals from the network over the link 395 and may convert the received signals into incoming test traffic 375 in a format usable to the traffic receiver unit 380.

The traffic receiver unit 380 may receive the incoming test traffic 375 from the network interface unit 370. The traffic receiver unit 380 may determine if each received packet is a member of a specific flow, and may accumulate test statistics for each flow in accordance with test instructions 314 provided by the port CPU 320. The accumulated test statistics may include, for example, a total number of received packets, a number of packets received out-of-sequence, a number of received packets with errors, a maximum, average, and minimum propagation delay, and other statistics for each flow. The traffic receiver unit 380 may also capture and store selected packets in accordance with capture criteria included in the test instructions 314. The traffic receiver unit 380 may provide test statistics and/or captured packets 384 to the port CPU 320, in accordance with the test instructions 314, for additional analysis during, or subsequent to, the test session.

The outgoing test traffic 365 and the incoming test traffic 375 may be primarily stateless, which is to say that a substantial portion of the outgoing test traffic 365 may be generated by the traffic generator 360 without expectation of any response and the incoming test traffic 375 may be received by the traffic receiver 380 without any intention of responding. The transmission and reception of stateless traffic may be sufficient to perform layer 2 and layer 3 testing of the network under test 390. However, to test the layer 4 (or higher layer) performance of a network device such as a server, server load balancer, or any device that performs DPI, a large number of TCP connections may be required between the port unit 310 and the network under test 390 during a test session. To test a network or network device capable of processing or inspecting encrypted communications, a large number of secure connections, such as SSL connections, may be required.

To establish and use SSL connections, the port CPU 320 may prepare appropriate TCP packets containing encrypted content and provide the TCP packets 316 to the traffic generator 360. The traffic generator 360 may insert the TCP packets into the outgoing test traffic 365. The traffic receiver 380 may separate received TCP packets from received stateless traffic and send the received TCP packets 382 to the port CPU 320 for decryption and processing.

Figure 1:
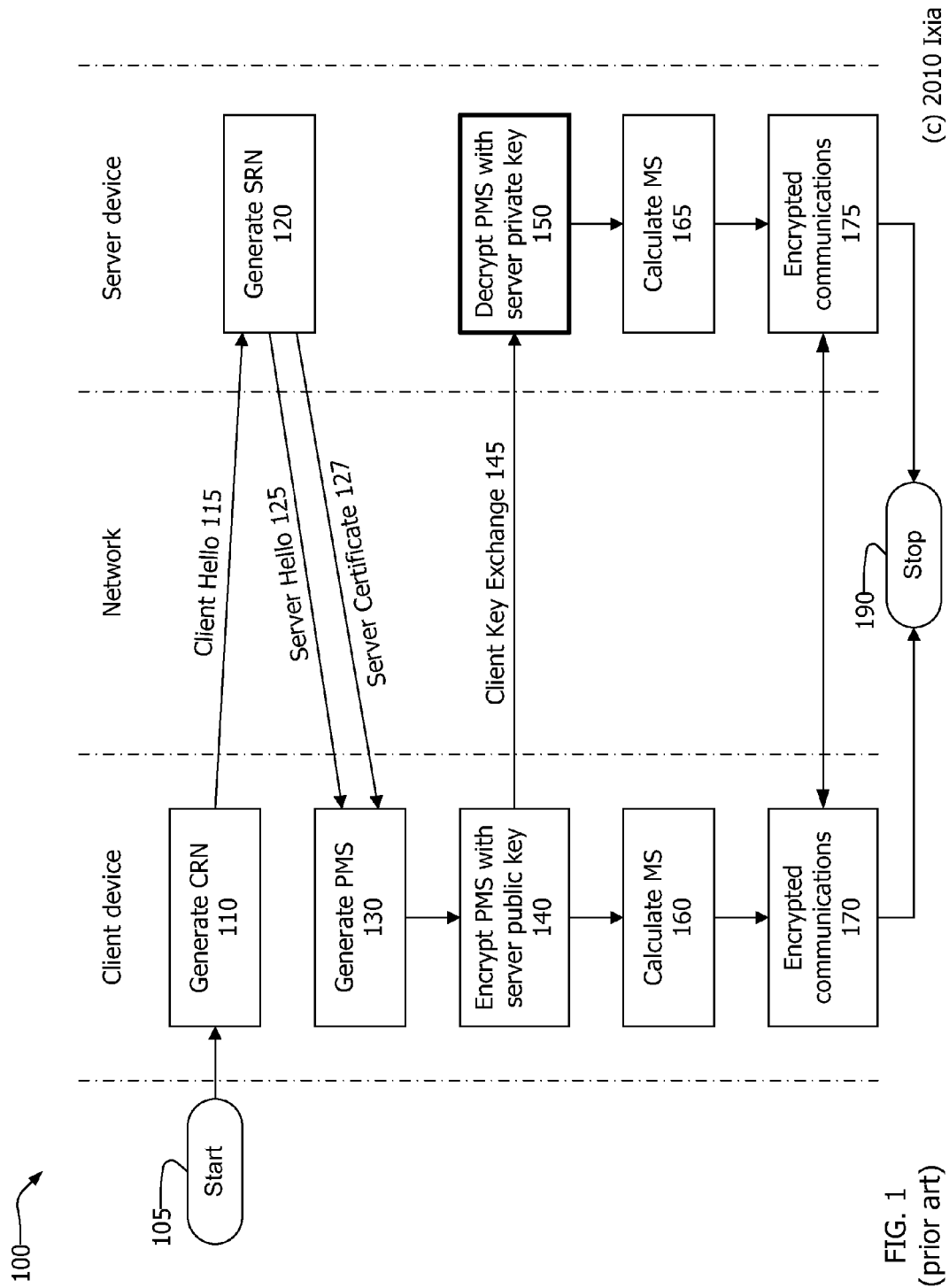
FIG. 1 is a flow chart of a process for exchanging cryptography data required to establish an SSL/TLS (secure socket layer/transport layer security) connection.
Figure 4:
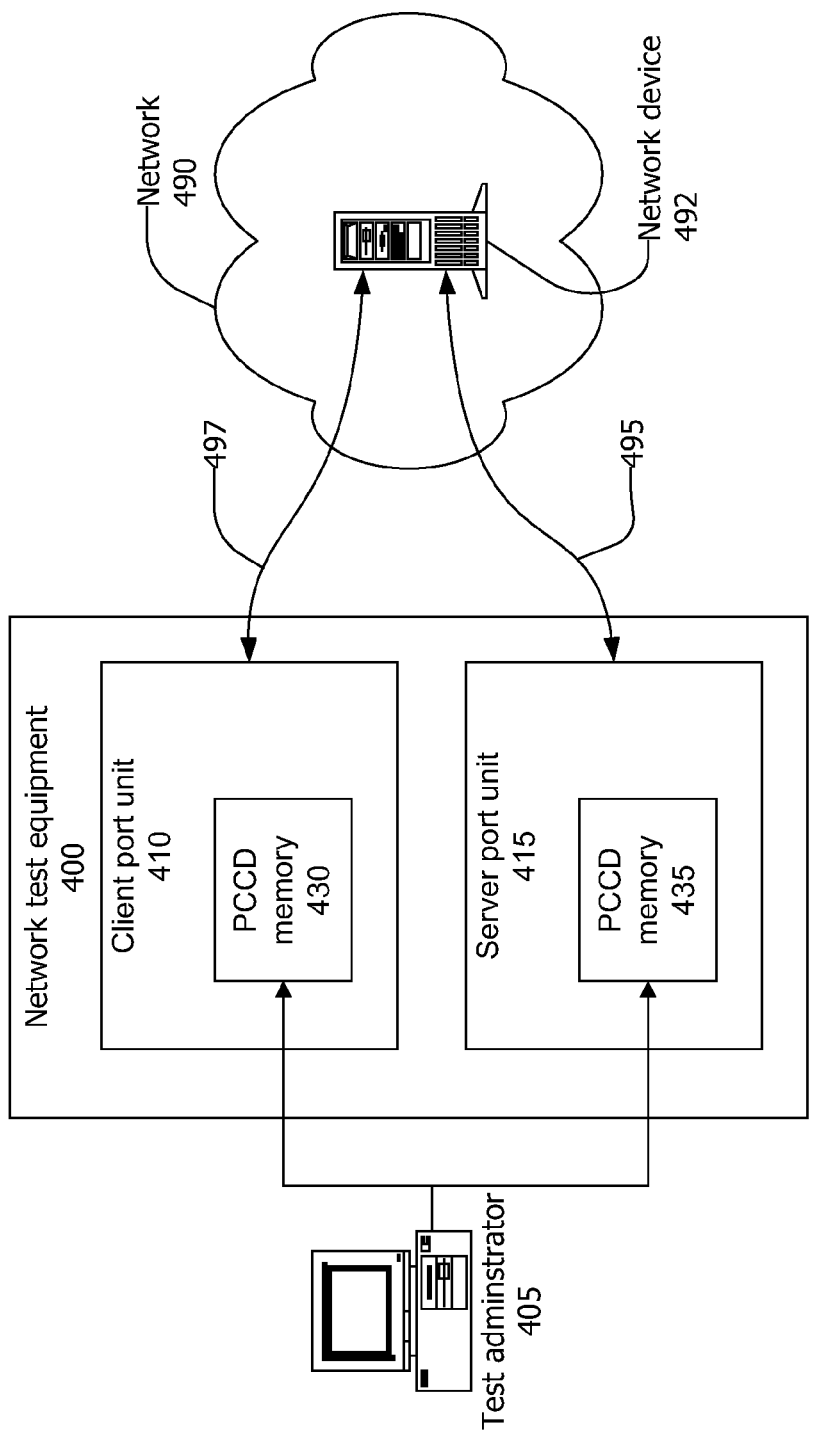
FIG. 4 is a block diagram of a test set-up for testing a network device that performs deep packet inspection (DPI).

When a network or network device is being tested, as shown in FIG. 4, the rolls of the client device and the server device in the process 100 of FIG. 1 may be filled by a client port unit 410 and a server port unit 415 within network test equipment 400. The client port unit 410 and the server port unit 415 may be in communications with a network device 492, which may be a device that performs DPI. When the network device 492 is tested in isolation, the client port unit 410 and the server post unit 415 may connect directly to the network device 492 via communications media 495, 497. When the network device 492 is a portion of a network under test, the client port unit 410 and the server post unit 415 may connect to the network device via communications media 495, 497 and a network 490.

When testing a network device, the rate at which SSL connections can be established may be limited by the processing power available within the port units 410, 415. In particular, decrypting the EPMS using the server private key at 150 in FIG. 1 requires extensive processing. About 90% of the processing time required to establish an SSL connection is used for the decryption operation at 150. Thus the actions performed by the server port unit 415 may require much more processing time than the actions performed by the client port unit 410, such that the client port unit 410 can establish many more connections per unit time than can the server port unit 415.

When testing the performance of network device that performs deep packet inspect, it is necessary that SSL connections comply with the SSL protocol. The content of simulated secure connections must be encrypted in order to test the ability of the network device to perform deep packet inspection and validation of secure network traffic. However, although the network traffic must appear to be secure to the network device 492, it is not necessary that the data carried by the simulated secure SSL connections actually be secure. Thus it is not necessary that the various random number generation and encryption/decryption operations of the SSL protocol (as shown in FIG. 1) actually be performed to open each SSL connection while testing a network device. As an alternative to performing the random number generation and encryption/decryption operations of the SSL protocol to open each SSL connection, the client port unit 410 and the server port unit 415 may include respective memories 430, 435 to store pre-computed cryptography data (PCCD). The PCCD may be used to open simulated secure connections between the client and server port units without performing any decryption and possibly without performing any encryption or random number generation. In this application, a "simulated secure connection" is a connection that appears to be secure to network devices through which the connection passes, but is not actually secure.

Figure 5:
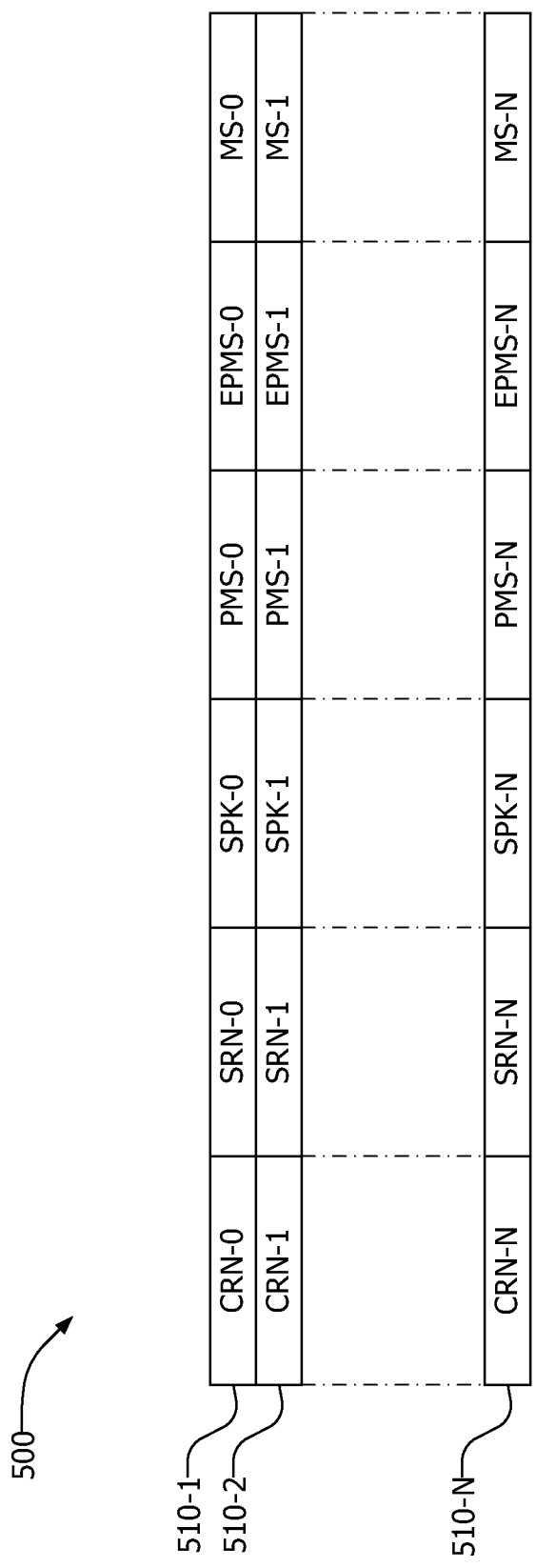
FIG. 5 is a graphical representation of predetermined cryptography data.

Referring now to FIG. 5, a PCCD memory 500 may contain one or more PCCD sets, 510-1 through 510-N, where N is an integer. Each PCCD set 510-1 to 510-N may include one or more of a CRN, a SRN, a server public key (SPK), a PMS, and EPMS, and a MS. Each PCCD set 510-1 to 510-N may be consistent with the SSL protocol. Specifically, within each PCCD set 510-1 to 510-N, a CRN, SRN, PMS may be random numbers, EPMS may be calculated from PMS using the associated SPK, and MS may be calculated from CRN, SRN, and PMS in accordance with the SSL protocol. The PCCD sets in the PCCD memory 500 may be calculated prior to the start of a test session, for example by a computing device such as the test administrator 405 in FIG. 4. The calculation of the PCCD sets prior to the start of a test session may be performed by port CPUs within port units, such as the port unit 310, or may be distributed between a test administrator computing device and one or more port units.

Referring back to FIG. 4, one or more PCCD sets may be defined, for example by the test administrator 405, and uploaded to the PCCD memories 430, 435 prior to the start of the test session. Although only two port units 410, 415 are shown in FIG. 4, the network test equipment may have more than two port units, each of which may establish SSL connections acting as a client, a server, or both during a test session. Thus some or all of the port units within the network test equipment 400 may include respective PCCD memories to store PCCD sets. The definition and calculation of the PCCDs sets may be distributed between the test administrator 405 and one or more processor with the port units.

Description of Processes

Figure 6:
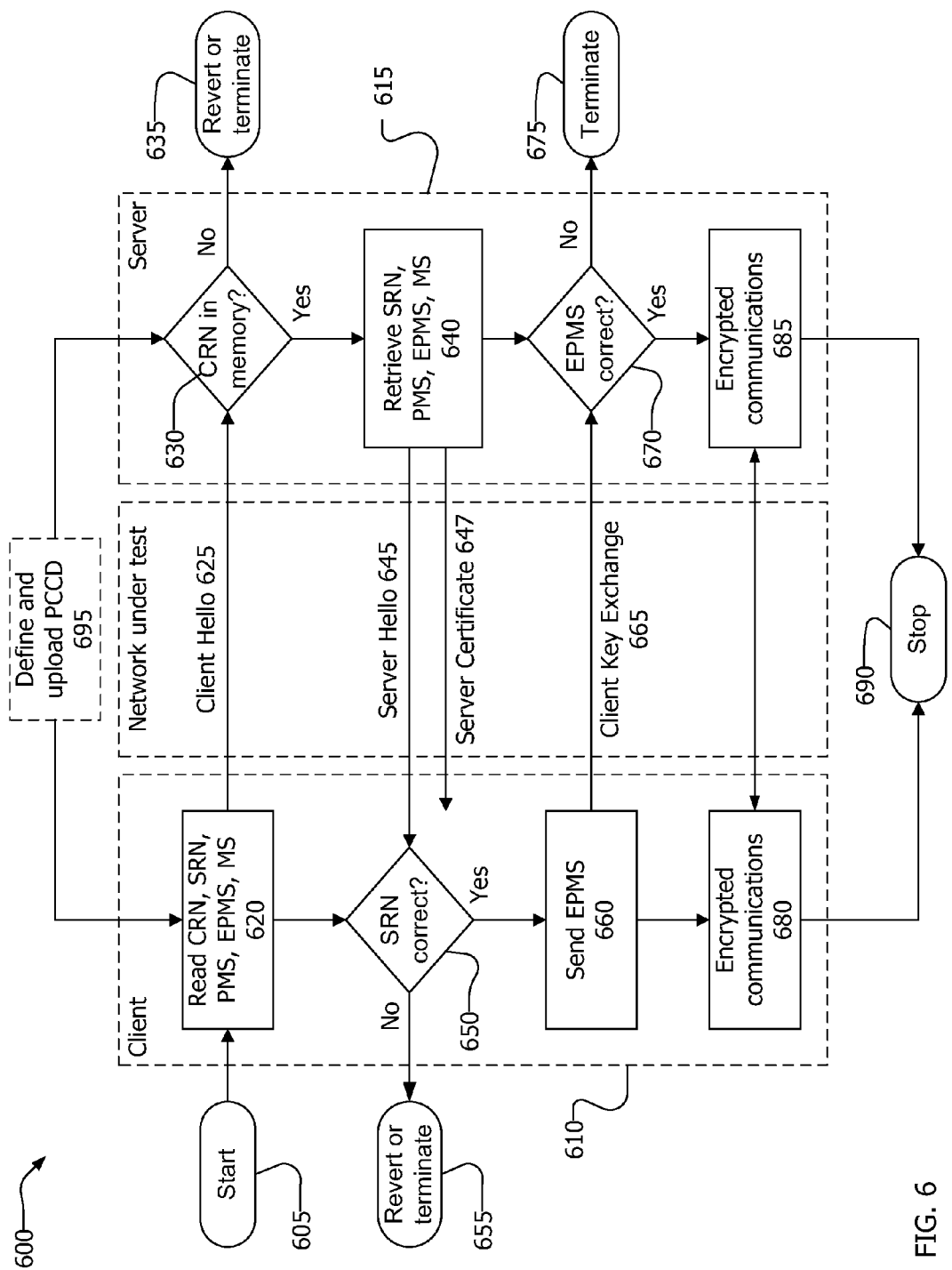
FIG. 6 is a flow chart of a process for testing a network that performs DPI.

FIG. 6 shows a flow chart of a process 600 for establishing and using a simulated SSL connection to test a network device. The simulated SSL connection may be established using a series of messages that simulate the conventional SSL handshake protocol without any actual encryption or decryption processing. Data transmitted via the simulated SSL connection may be encrypted, but not actually secure. The process 600 may be performed by a first port unit acting as a client 610 and a second port unit acting as a server 615. The client 610 and the server 615 may exchange a plurality of messages via the network device under test (not shown). For each SSL connection, the process 600 may start at 605 when the client 610 decides or is instructed to open an SSL connection. The process 600 may finish at 690, usually by mutual agreement of the client 610 and server 615. Multiple instances of the process 600 may be performed sequentially and/or concurrently to establish a plurality of SSL connections. The process 600 may be performed concurrently by multiple port units, each of which act as a client or as a server or both to establish a large plurality of SSL connections.

At 695, during preparation for a test session and prior to establishing any SSL connections, one or more pre-computed cryptography data (PCCD) sets may be calculated and uploaded to PCCD memories in the client 610 and server 615 and to additional port units, if present. For example, each PCCD set may include values for some or all of CRN, SRN, PMS, EPMS and MS in accordance with the SSL protocol, as shown in FIG. 5. Each PCCD set may include or be associated with a specific server public key (SPK). The action at 695 is not part of the process 600 and may be performed only once per test session regardless of the number of SSL connections to be established. The PCCD sets may be provided to the port units selectively, such that each port unit only receives PCCD sets it will require during the test session, or globally, such that each port unit receives all of the PCCD sets established at 695. Also at 695, all of the SPKs to be used during the test session may be provided to the network under test along with a server private key corresponding to each SPK, which is to say a server private key that can be used to decrypt information encrypted using the corresponding SPK.

At 620, the client 610 may initiate a simulated SSL connection by retrieving a PCCD set from a memory such as the PCCD memory of FIG. 5. When the PCCD memory includes a single PCCD set, all simulated SSL connections initiated by the client may use the same encryption data. When the PCCD memory includes plural PCCD sets, one of the PCCD sets may be selected at 620 randomly or in rotation or by some other technique. The client 610 may select a PCCD set containing or associated with a specific SPK in accordance with instructions for the test session. The client 610 may then send a client hello message 625 including the CRN from the retrieved PCCD set to the server 615. The client hello message 625 may include other information such as lists of compression protocols and encryption protocols supported by the client 610. In order to allow deep packet inspection of future packets sent via the simulated SSL connection being established, the network under test may extract the CRN and other information from the client hello message 625.

At 630, after receiving the client hello message, the server 615 may extract a received CRN from the received message and determine whether or not the server's PCCD memory contains a PCCD set including a CRN that matches the received CRN. If the server's PCCD memory does not contain a PCCD set including a CRN that matches the received CRN, the server 615 may revert to the traditional SSN handshake process at 630. To revert to the traditional SSL process, the server 615 may undertake action 120 of the process 100 of FIG. 1. If the server's PCCD memory does not contain a PCCD set including a CRN that matches the received CRN, the server 615 may simply terminate the connection (for example, by not responding to the client hello message 625) at 630. If the server's PCCD memory does not contain a PCCD set including a CRN that matches the received CRN, the server 615 may perform some other action at 630.

If the server's PCCD memory does contain a PCCD set including a CRN that matches the received CRN, at 630, the server 615 may retrieve the PCCD set that includes the matching CRN, including values for SRN, SPK, PMS, EPMS, and MS. The server 615 may then send a server hello message 645 to the client 610. The server hello message 645 may include the SRN retrieved from the server's PCCD memory at 640 and other information such as a selection of a compression protocol and an encryption protocol to be used once the SLL connection is established.

In order to allow deep packet inspection of future packets sent via the simulated SSL connection being established, the network under test may extract the SRN and other information from the server hello message 645.

The server 615 may also send a server certificate 647 to the client at 640. The server certificate 647 may include the SPK from the PCCD set retrieved from the server's PCCD memory at 640. Although the client 610 may not use the server public key during the process 600, the server certificate may be sent for the benefit of the network under test. In order to allow deep packet inspection of future packets sent via the simulated SSL connection being established, the network under test may extract the SPK from the server certificate 647.

After receiving the server hello message, at 650 the client 610 may extract a received SRN from the received message and determine if the received SRN matches the expected SRN retrieved from the client's PCCD memory at 620. If the received SRN does not match the expected SRN value, the client 610 may revert to the traditional SSN handshake process at 655. To revert to the traditional SSL process, the client may undertake action 130 of the process 100 of FIG. 1. If the received SRN does not match the expected SRN value, the client 610 may simply terminate the connection (for example, by not responding to the server hello message 645) at 655. If the received SRN does not match the expected SRN value, the client 610 may perform some other action at 655.

If the received SRN matches the expected SRN value, at 660, the client 610 may send a client key exchange message 665 containing the EPMS retrieved at 620 to the server 615. After receiving the client key exchange message from the client, at 670 the server 615 may determine if a received EPMS extracted from the client key exchange message matches the expected EPMS retrieved from the server's PCCD memory at 640. If the received EPMS does not match the expected EPMS, the server 615 may terminate the connection (for example, by not responding to any further messages from the client) at 675. If the received EPMS does not match the expected EPMS, the server 615 may perform some other action at 675.

In order to allow deep packet inspection of future packets sent via the simulated SSL connection being established, the network under test may extract the EPMS from the client key exchange message 665. The network under test may calculate a pre-master secret from the extracted EPMS using the server private key associated with the SPK previously extracted from the server certificate 647. The network under test may also calculate a master secret using the CRN and SRN extracted from the client and server hello messages and the pre-master secret.

When the received EPMS matches the expected EPMS at 670, the client 610 and server 615 may exchange additional messages using symmetrical encryption based on the MS extracted from their respective PCCD memories at 620 and 640, respectfully. Alternatively, either or both of the client 610 and the server 615 may calculate the MS from the CRN, SRN, and PMS, in which case the MS need not be included in each PCCD. Encrypted communications between the client 610 and server 615 may continue at 680 and 685 until the simulated SSL connection is terminated at 690. Since the device under test has calculated the same MS value based on the CRN and SRN extracted from the client and server hello messages 625/645, the EPMS extracted from the client key exchange message 665, and the server private key associated with the SPK extracted from the server certificate 647, the device under test may decrypt the encrypted communications to perform deep packet inspection.

Figure 7:
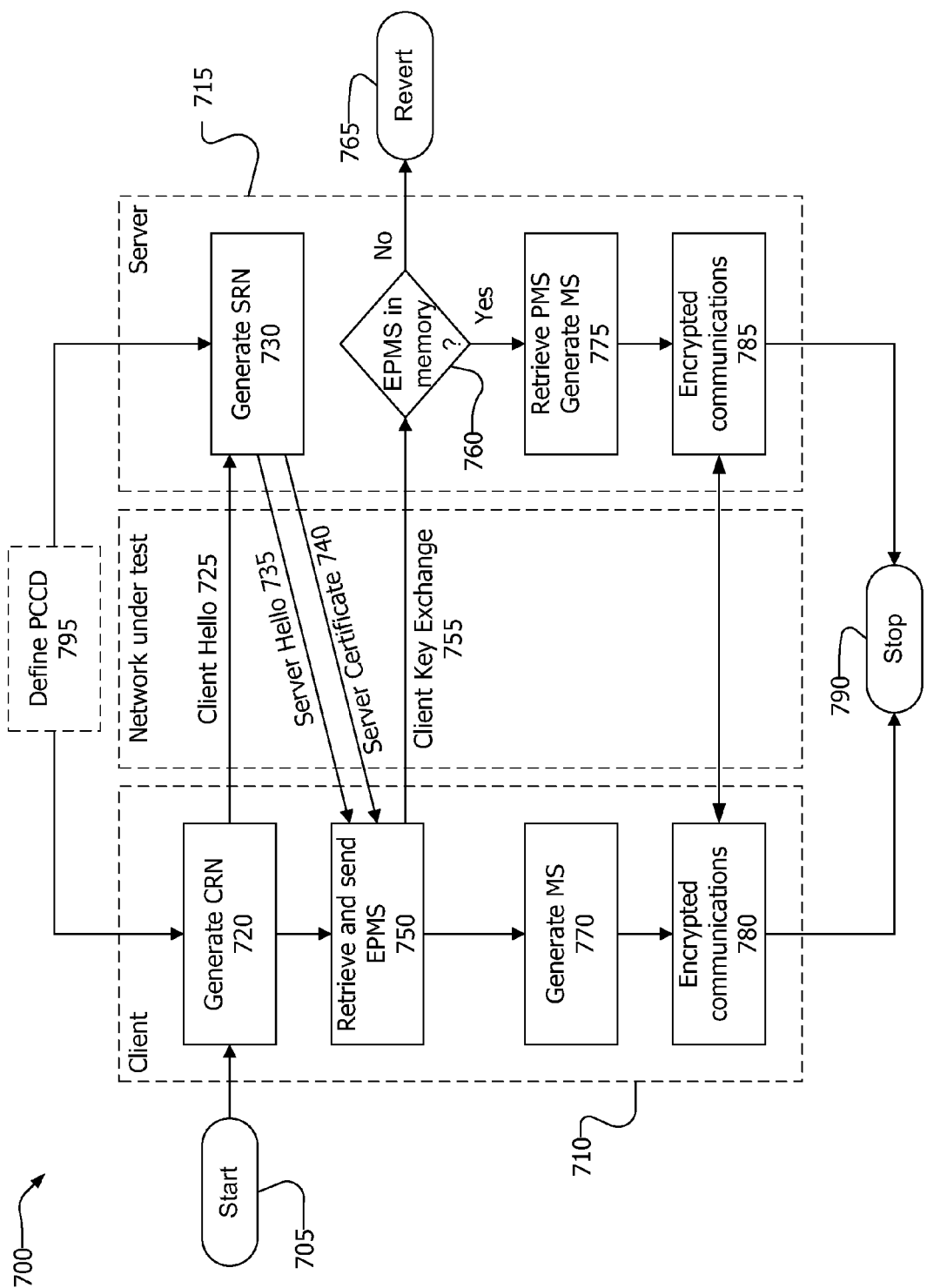
FIG. 7 is a flow chart of another process for testing a network that performs DPI.

FIG. 7 shows a flow chart of another process 700 for establishing and using a simulated SSL connection to test a network device. The simulated SSL connection may be established using a series of messages that simulate the conventional SSL handshake protocol without any asymmetrical encryption or decryption processing. Data transmitted via the simulated SSL connection may be encrypted, but not actually secure. The process 600 may be performed by a first port unit acting as a client 610 and a second port unit acting as a server 615. Compared to the process 600, the process 700 requires significantly less memory for storing PCCD data, but requires additional processing within the client 710 and the server 715.

The client 710 and the server 715 may exchange a plurality of messages via the network device under test (not shown). For each SSL connection, the process 700 may start at 705 when the client 710 decides or is instructed to open an SSL connection. The process 700 may finish at 790, usually by mutual agreement of the client 710 and server 715. Multiple instances of the process 700 may be performed sequentially and/or concurrently to establish a plurality of SSL connections. One or more instances of the process 700 may be performed concurrently with one or more instances of the process 600. The processes 600 and 700 may be performed concurrently by multiple port units, each of which act as a client or as a server or both to establish a large plurality of SSL connections.

At 795, during preparation for a test session and prior to establishing any SSL connections, one or more pre-computed cryptography data (PCCD) sets may be calculated and uploaded to PCCD memories in the client 710 and server 715 and to additional port units, if present. The action at 795 is not part of the process 700 and may be performed only once per test session regardless of the number of SSL connections to be established. Each PCCD set may include a pre-master secret (PMS) and an encrypted pre-master secret (EPMS) calculated using an associated server public key (SPK). Each port unit acting as a server may be provided with one or more SPK values. Each port unit acting as either a server or client may be provided with one or more PCCD sets associated with each SPK value. The PCCD sets may be provided to the port units selectively, such that each port unit only receives PCCD sets it will require during the test session, or globally, such that each port unit receives all of the PCCD sets established at 795. At 795, all of the SPKs to be used during the test session may be provided to the network under test along with a server private key corresponding to each SPK.

At 720, the client 710 may initiate a simulated SSL connection by calculating a client random number (CRN). The client 710 may then send a client hello message 725 including the CRN to the server 715. The client hello message 725 may include other information such as lists of compression protocols and encryption protocols supported by the client 710. In order to allow deep packet inspection of future packets sent via the simulated SSL connection being established, the network under test may extract the CRN and other information from the client hello message 725.

At 730, after receiving the client hello message, the server 715 may calculate a server random number (SRN) and send a server hello message 745 to the client 710. The server hello message 745 may include the calculated SRN and other information such as a selection of a compression protocol and an encryption protocol to be used once the SLL connection is established.

In order to allow deep packet inspection of future packets sent via the simulated SSL connection being established, the network under test may extract the SRN and other information from the server hello message 745.

The server 715 may also send a server certificate 740 to the client at 740. The server certificate 740 may include an SPK value assigned to the server 715 at 795. The SPK value may be selected from a plurality of SPK values assigned to the server 715 at 795. In order to allow deep packet inspection of future packets sent via the simulated SSL connection being established, the network under test may extract the SPK from the server certificate message 740.

After receiving the server hello message, at 750 the client 710 may extract a received SRN from the received message. At 750, the client may also extract the SPK from the server certificate 740. The client 710 may then retrieve a PCCD set associated with the extracted SPK from the client's PCDD memory. The PCCD set may include a PMS and an EPMS. The client 710 may then send a client key exchange message 755 containing the EPMS from the retrieved PCCD set to the server 715.

In order to allow deep packet inspection of future packets sent via the simulated SSL connection being established, the network under test may extract the EPMS from the client key exchange message 755. The network under test may calculate a PMS from the EPMS using the server private key associated with the SPK previously extracted from the server certificate 647. The network under test may further calculate a master secret based on the CRN and SRN extracted form the client and server hello messages and the PMS.

After receiving the client key exchange message 755 from the client, at 760 the server 715 may determine if a received EPMS extracted from the client key exchange message matches an EPMS value in the server's PCCD memory at 640. If the received EPMS does not match an expected EPMS value, the server 715 may calculate PMS from the EPMS normally (using the server private key). Alternatively, the server 715 may terminate the connection or take some other action if the received EPMS does not match the expected EPMS.

When the received EPMS matches an expected EPMS at 760, the server 715 may retrieve the associated PMS from its PCCD memory at 775 and calculate a master secret (MS) based on the CRN, the SRN, and the retrieved PMS. Similarly, the client 710 may retrieve the same PMS from its PCCD memory at 770 and calculate the same MS based on the CRN, the SRN, and the retrieved MS.

The client 710 and server 715 may exchange additional messages using symmetrical encryption based on the MS calculated at 770 and 775. Encrypted communications between the client 710 and server 715 may continue at 780 and 785 until the simulated SSL connection is terminated at 790. Since the device under test has calculated the same MS value, the device under test may decrypt the encrypted communications to perform deep packet inspection.

While the previous examples were based on the SSL protocol, the same techniques may be applied to other security protocols that establish connections using a handshake requiring asymmetrical encryption. Each PCCD set for establishing simulated secure connections in accordance with other security protocols may be associated with a respective encryption key, and each PCCD set may contain a first parameter and a second parameter generated by encrypting the first parameter using the associated encryption key.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method performed by a test system including a plurality of port units coupled to a network under test, comprising:
    prior to opening any network connections, defining and storing one or more pre-computed cryptography data (PCCD) sets in a first PCCD memory and a second PCCD memory located respectively within a first port unit and a second port unit of the plurality of port units, each PCCD set including at least a first parameter and a second parameter generated by encrypting the first parameter; and
    opening a simulated secure connection between the first port unit and the second port unit via the network under test using a selected PCCD set from the one or more PCCD sets, the simulated secure connection opened without performing decryption processing.

2. The method of claim 1, wherein opening a simulated secure connection comprises the first port unit and the second port unit exchanging messages containing data from the selected PCCD set via the network under test.

3. The method of claim 1, wherein
the simulated secure connection appears, to the network under test, to comply with a secure communications protocol.

4. The method of claim 3, wherein
the secure communications protocol utilizes asymmetrical encryption based on a server private key and a corresponding server public key to encrypt at least one message,
each PCCD set is associated with a respective encryption key from a plurality of encryption keys to be used during a test session, and
the second parameter of each PCCD set is generated by encrypting the first parameter of the PCCD set using the associated encryption key.

5. The method of claim 4, further comprising:
providing the plurality of encryption keys to be used to encrypt messages during a test session and a corresponding plurality of decryption keys to be used to decrypt the messages to the network under test prior to starting the test session.

6. The method of claim 3, wherein
the secure communications protocol is a secure sockets layer (SSL) or transmission layer security (TLS) protocol, and
the first parameter in each PCCD set is a pre-master secret (PMS) and the second parameter in each PCCD set is an encrypted pre-master secret (EPMS) in accordance with the SSL/TLS protocol.

7. The method of claim 6, further comprising:
the second port unit sending a server certificate containing a server public key (SPK) from the plurality of encryption keys to the first port unit via the network under test;
the first port unit retrieving, from the first PCCD memory, a PCCD set associated with the SPK from the server certificate; and
the first port unit sending the EPMS from the retrieved PCCD set to the second port unit via the network under test.

8. The method of claim 7, further comprising:
the second port unit determining whether or not the second PCCD memory contains a PCCD set including an EPMS matching the EPMS sent by the first port unit.

9. The method of claim 8, further comprising:
when the second PCCD memory does not contain a PCCD set including an EPMS matching the EPMS sent by the first port unit, the second port unit reverting to a conventional SSL handshake method.

10. The method of claim 8, further comprising:
when the second PCCD memory does not contain a PCCD set including an EPMS matching the EPMS sent by the first port unit, the second port unit terminating the simulated secure connection between the first port unit and the second port unit.

11. The method of claim 8, further comprising:
when the second PCCD memory contains a PCCD set including an EPMS matching the EPMS sent by the first port unit, the second port unit retrieving the PCCD set containing the EPMS that matches the EPMS sent by the first port unit, and the first port unit and the second port unit communicating via the simulated secure connection using symmetrical encryption based a MS calculated based, in part, on the PMS from their respective retrieved PCCD sets.

12. The method of claim 6, wherein each PCCD set further includes a client random number (CRN), a server random number (SRN), and a master secret (MS) calculated from the CRN, the SRN, and the PMS in accordance with the SSL/TLS protocol.

13. A method performed by a first port unit acting as a client to test secure network connections in accordance with a Secure Sockets Layer or Transport Layer Security (SSL/TLS) protocol, comprising:
prior to opening any network connections, defining and storing one or more pre-computed cryptography data (PCCD) sets in a PCCD memory within the first port unit, each PCCD set associated with a respective server public key (SPK), each PCCD set including a pre-master secret (PMS) and an encrypted pre-master secret (EPMS) generated by encrypting the PMS using the associated SPK;
receiving a server certificate from a second port unit via a network under test, the server certificate containing a received SPK;
selecting a PCCD associated with the received SPK from the one or more PCCD sets stored in the PCCD memory; and
sending the EPMS from the selected PCCD set to the second port unit via the network under test.

14. The method of claim 13, further comprising;
prior to receiving the server certificate, sending a client hello message containing a client random number (CRN) to the second port unit via the network under test, and receiving, in response to the client hello message, a server hello message containing a server random number (SRN).

15. The method of claim 14, further comprising:
exchanging simulated secure messages with the second port unit via the network under test using symmetrical encryption based on a master secret calculated from the CRN, the SRN, and the PMS of the selected PCCD set.

16. A method performed by a first port unit acting as a server to test secure network connections in accordance with a Secure Sockets Layer or Transport Layer Security (SSL/TLS) protocol, comprising:
prior to opening any network connections, defining and storing one or more pre-computed cryptography data (PCCD) sets in a PCCD memory within the first port unit, each PCCD set associated with a respective server public key (SPK), each PCCD set including a pre-master secret (PMS) and an encrypted pre-master secret (EPMS) generated by encrypting the PMS using the associated SPK;
receiving a client hello message containing a client random number (CRN) from a second port unit via a network under test; and
in response to the client hello message, sending a server hello message and server certificate to the second port unit via the network under test, the server hello message containing a server random number (SRN), and the server certificate containing a SPK associated with a selected PCCD set from the one or more PCCD sets stored in the PCCD memory.

17. The method of claim 16, further comprising:
receiving a client key exchange message from the second port unit via the network under test;
determining whether or not a received EPMS extracted from the client key exchange message matches the EPMS from the selected PCCD set;
when the received EPMS does not match the EPPMS from the selected PCCD set, terminating communications between the first port unit and the second port unit; and when the received EPMS does match the EPMS from the selected PCCD set, communicating with the second port unit via the network under test using symmetrical encryption based on a MS calculated from the CRN, the SRN, and the PMS from the selected PCCD set.

18. A non-transitory computer-readable storage medium storing instructions that, when executed by a first computing device, causes the first computing device to act as a client to test secure network connections in accordance with a Secure Sockets Layer or Transport Layer Security (SSL/TLS) protocol, the first computing device performing actions comprising:

prior to opening any network connections, defining and storing one or more pre-computed cryptography data (PCCD) sets in a PCCD memory coupled to the first computing device, each PCCD set associated with a respective server public key (SPK), each PCCD set including a pre-master secret (PMS) and an encrypted pre-master secret (EPMS) generated by encrypting the PMS using the associated SPK;

receiving a server certificate from a second computing device via a network under test, the server certificate containing a received SPK;

selecting a PCCD associated with the received SPK from the one or more PCCD sets stored in the PCCD memory; and sending the EPMS from the selected PCCD set to the second computing device via the network under test.

19. The non-transitory computer-readable storage medium of claim 18, the actions performed further comprising, prior to receiving the server certificate:

sending a client hello message containing a client random number (CRN) to the second computing device via the network under test; and receiving, in response to the client hello message, a server hello message containing a server random number (SRN).

20. The non-transitory computer-readable storage medium of claim 19, the actions performed further comprising:

exchanging simulated secure messages with the second computing device via the network under test using symmetrical encryption based on a master secret calculated from the CRN, the SRN, and the PMS of the selected PCCD set.

21. A non-transitory computer-readable storage medium storing instructions that, when executed by a first computing device, cause the first computing device to act as a server to test secure network connections in accordance with a Secure Sockets Layer or Transport Layer Security (SSL/TLS) protocol, the first computing device performing actions comprising:

prior to opening any network connections, defining and storing one or more pre-computed cryptography data (PCCD) sets in a PCCD memory coupled to the first computing device, each PCCD set associated with a respective server public key (SPK), each PCCD set including a pre-master secret (PMS) and an encrypted pre-master secret (EPMS) generated by encrypting the PMS using the associated SPK;

receiving a client hello message containing a client random number (CRN) from a second computing device via a network under test; and in response to the client hello message, sending a server hello message and server certificate to the second computing device via the network under test, the server hello message containing a server random number (SRN), and the server certificate containing a SPK associated with a selected PCCD set from the one or more PCCD sets stored in the PCCD memory.

22. The non-transitory computer-readable storage medium claim 21, the actions performed further comprising:

receiving a client key exchange message from the second computing device via the network under test;

determining whether or not a received EPMS extracted from the client key exchange message matches the EPMS from the selected PCCD set;

when the received EPMS does not match the EPPMS from the selected PCCD set, terminating communications with the second computing device; and when the received EPMS does match the EPMS from the selected PCCD set, communicating with the second computing device via the network under test using symmetrical encryption based on a master secret calculated from the CRN, the SRN, and the PMS from the selected PCCD set.

* * * * *